(12) United States Patent
Trinick et al.

(10) Patent No.: US 11,819,905 B2
(45) Date of Patent: Nov. 21, 2023

(54) METHOD OF FORMING A RIVETED JOINT (71) Applicant: Atlas Copco IAS UK Limited, Flintshire (GB)

(72) Inventors: Russell John Trinick, Flintshire (GB); Samuel Williams, Flintshire (GB); Elliot Jones, Flintshire (GB)

(73) Assignee: Atlas Copco IAS UK Limited, Flintshire (GB)

( * ) Notice: Subject to any disclaimer, the term of this patent is extended or adjusted under 35 U.S.C. 154(b) by 0 days.

(21) Appl. No.: 17/265,603

(22) PCT Filed: Aug. 5, 2019

(86) PCT No.: PCT/GB2019/052193
§ 371 (c)(1),
(2) Date: Feb. 3, 2021

(87) PCT Pub. No.: WO2020/025983
PCT Pub. Date: Feb. 6, 2020

(65) Prior Publication Data
US 2021/0162486 A1     Jun. 3, 2021

(30) Foreign Application Priority Data
Aug. 3, 2018 (GB) .................................... 1812686

(51) Int. Cl.
*B21J 15/04* (2006.01)
*F16B 5/04* (2006.01)
(52) U.S. Cl.
CPC ................ *B21J 15/04* (2013.01); *F16B 5/04* (2013.01)

(58) Field of Classification Search
CPC ............ F16B 19/086; F16B 5/04; B25J 15/04
See application file for complete search history.

(56) References Cited

U.S. PATENT DOCUMENTS 6,263,560 B1 * 7/2001 Edwards ................ B21J 15/025
29/524.1
6,692,213 B1   2/2004 Butler
(Continued)

FOREIGN PATENT DOCUMENTS

CN     101253338 A    8/2008
CN     101472690 A    7/2009
(Continued)

OTHER PUBLICATIONS

Machine translation of DE-102008005289-A1 (Year: 2009).*
(Continued)

*Primary Examiner* — Kyle A Cook
(74) *Attorney, Agent, or Firm* — Michael Best & Friedrich (57) ABSTRACT

According to a first aspect of the invention there as provided a method of forming a riveted joint comprising a UHSS layer and a non-UHSS layer using a self-piercing rivet comprising a head and a shank, an outer diameter of a top of the shank being greater than an outer diameter of a bottom of the shank before insertion of the rivet, the method comprising pushing the self-piercing rivet into the UHSS layer such that the lower portion of the shank flares outwards and cuts a slug from the UHSS, and pushing the flared shank of the self-piercing rivet and the slug into the non-UHSS layer such that the non-UHSS layer deforms into a die recess and flows around an outer surface of the flared shank.

3 Claims, 7 Drawing Sheets

(56) References Cited

U.S. PATENT DOCUMENTS

| | | | |
|---|---|---|---|
| 8,671,726 | B2 | 3/2014 | Clew et al. |
| 2008/0232930 | A1* | 9/2008 | Jokisch ................ F16B 19/086 411/501 |
| 2010/0232906 | A1* | 9/2010 | Singh .................... F16B 19/086 411/501 |
| 2011/0016939 | A1 | 1/2011 | Clew et al. |
| 2013/0115027 | A1 | 5/2013 | Wendt et al. |
| 2016/0281757 | A1* | 9/2016 | Hofmann .............. F16B 19/086 |
| 2016/0325342 | A1 | 11/2016 | Gostylla et al. |
| 2016/0332215 | A1* | 11/2016 | Blacket ................ B21J 15/027 |
| 2018/0045237 | A1 | 2/2018 | Hofmann et al. |
| 2021/0087655 | A1* | 3/2021 | Ramasamy ............ C22C 21/06 |

FOREIGN PATENT DOCUMENTS

| | | | | |
|---|---|---|---|---|
| CN | 105980717 A | | 9/2016 | |
| CN | 106102956 A | | 11/2016 | |
| DE | 102008005289 A1 | * | 7/2009 | ............ B21J 15/025 |
| GB | 2428077 A | * | 1/2007 | ............ B21J 15/025 |
| JP | 2007064439 A | | 3/2007 | |
| JP | 2018008300 A | | 1/2018 | |
| WO | WO-2012113463 A1 | * | 8/2012 | ............... A63H 3/04 |
| WO | 2015107350 A1 | | 7/2015 | |

OTHER PUBLICATIONS

Machine translation of WO-2012113463-A1 (Year: 2012).*
United Kingdom Intellectual Property Office Search Report for Application No. GB1812686.2 dated Jan. 17, 2019 (4 pages).
International Preliminary Report on Patentability for Application No. PCT/GB2019/052193 dated Feb. 9, 2021 (11 pages).
International Search Report and Written Opinion for Application No. PCT/GB2019/052193 dated Jan. 8, 2020 (16 pages).
Chinese Patent Office Action for Related Application No. 2019800656384 dated Oct. 9, 2022 (16 pages, including an English translation).
Japanese Patent Office Action for Application No. 2021-505681 dated Apr. 4, 2023 (11 pages, English translation included).

* cited by examiner

METHOD OF FORMING A RIVETED JOINT

RELATED APPLICATION DATA

This application is a U.S. National phase application of International Application No. PCT/GB2019/052193 filed Aug. 5, 2019, which claims priority to Application No. GB 1812686.2 filed Aug. 3, 2018, the entire contents of both of which are incorporated by reference herein.

The present invention relates to a method of joining a workpiece which comprises Ultra High Strength Steel (UHSS), and also relates to associated rivets. The method may be used to join a sheet of UHSS to a non-UHSS sheet (e.g. a sheet of softer more ductile material such as aluminium).

Self-piercing rivets are a well-established technology and are used, in combination with adhesives, to join metal work pieces together. Self-piercing rivets are used in the automotive industry to join aluminium vehicle panels together. Aluminium is particularly suited to joining using self-piercing rivets because it is relatively soft and relatively ductile. In a typical joint formed using a self-piercing rivet, two overlapping sheets of material are positioned over a suitably shaped die. A self-piercing rivet is inserted into the sheets of material. A shank of the rivet passes through the upper sheet of material and then flares outwardly as it travels into the lower sheet of material and approaches the die. When the shank flares outwardly it extends into the lower sheet such that material of the lower sheet encapsulates the flared portion of the shank. This provides a secure engagement between the rivet and the lower sheet of material. The upper and lower sheets of material are securely held between a head of the rivet and the flared shank of the rivets, thereby forming a secure joint of the material. During rivet insertion the lower sheet material flows into the die and forms a so-called button (a raised disk) of material. Joining sheets of aluminium in this manner is efficient and effective, and is used extensively in the automotive industry during construction of aluminium bodied vehicles.

Although self-piercing rivets are very effective in joining relatively soft and ductile materials such as aluminium, they are less suited to joining harder and less ductile material such as Ultra High Strength Steel (UHSS). UHSS may be considered to mean steel with a tensile strength of 800 MPa or more. Forming a joint in a workpiece that comprises UHSS using a self-piercing rivet is challenging. This is because the tensile strength of the UHSS is such that it is difficult for the rivet to penetrate through the UHSS. The shank of the rivet will tend to collapse when an attempt is made to push it into the UHSS. To avoid this problem the wall of the shank may be made thicker in order to increase the column strength of the shank. This will allow the shank to penetrate the UHSS without buckling. However, if the shank of the rivet is thicker it will flare less when it is inserted into the workpiece. As a result, there may be insufficient engagement between the rivet and a lowermost sheet of the workpiece.

A further problem associated with joining a workpiece comprising a UHSS sheet, particularly if the rivet has an increased shank wall thickness, is that it is difficult to accommodate a slug of UHSS within the rivet bore. The UHSS slug may instead remain beneath the shank of the rivet, and may be pushed downwards into the workpiece by the rivet. The UHSS slug may compress a lowermost sheet of a joint until it that sheet becomes too thin, and in some instances the UHSS slug may cut through the lowermost surface of the join. These issues may result in a poor quality join.

An additional or alternative way of avoiding rivet shank collapse when joining a workpiece that comprises a UHSS sheet is to use a rivet with a very high hardness (e.g. a hardness of 530 HV or more). This allows the rivet to penetrate into the UHSS without collapsing. However, rivets with very high hardness are relatively brittle and often exhibit cracks when they have been inserted into a workpiece. This results in a joint which is relatively weak and may be prone to failure when the joint is subjected to a dynamic load (as may be experienced for example when a vehicle is moving).

It is an object of the present invention to provide a method joining a workpiece which overcomes a disadvantage associated with the prior art.

SUMMARY

According to a first aspect of the invention there as provided a method of forming a riveted joint comprising a UHSS layer and a non-UHSS layer using a self-piercing rivet comprising a head and a shank, an outer diameter of a top of the shank being greater than an outer diameter of a bottom of the shank before insertion of the rivet, the method comprising pushing the self-piercing rivet into the UHSS layer such that the lower portion of the shank flares outwards and cuts a slug from the UHSS, and pushing the flared shank of the self-piercing rivet and the slug into the non-UHSS layer such that the non-UHSS layer deforms into a die recess and flows around an outer surface of the flared shank.

By flowing the non-UHSS layer around the outer surface of the flared shank, the invention is able to form a strong joint despite the fact that the shank is already flared when it enters the non-UHSS layer. This is in contrast to conventional self-piercing rivet joining methods, which rely upon the shank flaring when it enters a lowermost layer of a workpiece.

A hole cut from the UHSS may have a diameter which is greater the outer diameter of the bottom of the shank before insertion of the rivet. The outer diameter of the top of the shank may be sufficiently large to provide contact with the UHSS layer around a circumference of the shank. This is advantageous because when there is contact between the rivet shank and the UHSS layer around the circumference of the shank, the contact prevents moisture ingress into the joint. Moisture ingress is undesirable because the moisture may cause corrosion.

The die may have a diameter which is no more than 2.5 mm greater than the outer diameter of the bottom of the shank before insertion of the rivet. This small difference of diameter helps to flow the non-UHSS layer around the outer surface of the flared shank.

The die may have a diameter which is at least 1.5 mm greater than the outer diameter of the bottom of the shank before insertion of the rivet.

The outer diameter of a top of the shank may be up to 12% larger than the outer diameter of the bottom of the shank.

The shank may comprise an upper portion and a lower portion, the upper portion having a greater diameter than the lower portion. A transition from the upper portion to the lower portion may be tapered. The taper may allow the upper portion of the rivet to enter the UHSS layer without excessive force being required (if a step were present then excessive force might be needed).

The shank may comprise an upper portion and a lower portion, and wherein the upper portion of the shank is tapered.

The shank may be tapered from the top of the shank to the bottom of the shank.

The taper may help to ensure that there is contact between the rivet shank and the UHSS layer around the circumference of the shank.

The die may include an annular ridge which extends around a cavity of the die.

The annular ridge may include a tapered face which is generally directed towards the rivet.

According to a second aspect of the invention there is provided a method of forming a riveted joint comprising a UHSS layer and a non-UHSS layer, using a self-piercing rivet comprising a head and a shank, the shank comprising a lower shank portion, a middle shank portion and an upper shank portion, the middle shank portion having a diameter which is less than the diameter of the upper shank portion and the lower shank portion, the method comprising pushing the self-piercing rivet into the UHSS layer such that the lower portion of the rivet cuts a slug from the UHSS, and pushing the self-piercing rivet and slug into the non-UHSS layer such the lower portion of the shank cuts a slug from the non-UHSS layer, wherein a die receives the slugs of UHSS and non-UHSS, and wherein the die promotes flow of the non-UHSS around an outer surface of the lower shank portion.

By flowing the non-UHSS around the outer surface of the lower shank portion, the invention is able to form a strong joint even if little or no flaring of the shank occurs.

The die may comprise an annular ridge which extends around a cavity of the die.

The annular ridge may include a tapered face which is generally directed towards the rivet.

The die may have a cylindrical opening with a diameter which is between 0.5 mm and 1 mm greater than the diameter of the lower shank portion.

Insertion of the rivet into the UHSS may cause the shank of the rivet to flare outwardly.

According to a third aspect of the invention there is provided a method of forming a riveted joint comprising a UHSS layer and a non-UHSS layer, using a self-piercing rivet comprising a head and a shank, the shank comprising a lower shank portion, and an upper shank portion, a recess extending at least part way into the lower shank portion, wherein an outer diameter of the upper shank portion is greater than an outer diameter of the lower shank portion, the method comprising pushing the self-piercing rivet into the UHSS layer such that the lower portion of the shank flares outwardly and cuts a slug from the UHSS, and pushing the self-piercing rivet and slug into the non-UHSS layer such the lower portion of the shank cuts a slug from the non-UHSS layer, wherein a die receives the slugs of UHSS and non-UHSS, and wherein the die promotes flow of the non-UHSS around an outer surface of the lower shank portion, wherein the upper portion of the shank comes into contact with the UHSS layer around a circumference of the shank.

An advantage of the third aspect of the invention is that it is relatively easy to fabricate the self-piercing rivet. Removing a lowermost portion of the outside of the shank and forming a recess in the shank is relatively straightforward, compared for example with removing a middle portion of the outside of the shank.

The die may comprise an annular ridge which extends around a cavity of the die.

The annular ridge may include a tapered face which is generally directed towards the rivet.

The die may have a cylindrical opening with a diameter which is between 0.5 mm and 1 mm greater than the diameter of the lower shank portion.

According to a fourth aspect of the invention there is provided a vehicle comprising a riveted joint formed according to the method of any preceding claim.

According to a fifth embodiment of the invention there is provided a self-piercing rivet comprising a head and a shank, an outer diameter of a top of the shank being greater than an outer diameter of a bottom of the shank before insertion of the rivet.

The shank may comprise an upper portion and a lower portion. An outer diameter of the upper portion of the shank may be greater than an outer diameter of the lower portion of the shank.

A recess may be provided in the shank.

The recess may be provided in the lower portion of the shank.

The recess may have a depth which is less than half of the length of the rivet. The recess may have a depth which is less than quarter of the length of the rivet.

A tapered transition may extend between the upper portion and the lower portion of the shank.

The outer diameter at the top of the shank may be up to 12% larger than the outer diameter of the bottom of the shank.

The outer diameter of the upper portion of the shank may be up to 12% larger than the outer diameter of the lower portion of the shank.

A lowermost portion of the recess may be tapered.

The recess may include a cylindrical portion.

The cylindrical portion of the recess in the shank may define a cylindrical wall portion of the shank. A shank wall thickness of the cylindrical shank wall portion may have a ratio of between 0.16 and 0.3 relative to the outer diameter of the shank at the cylindrical shank wall portion.

The cylindrical shank wall portion may have a shank wall thickness in the range 1.0 mm to 1.5 mm.

The shank may have an outer diameter which is tapered from the top of the shank to the bottom of the shank.

The shank of the rivet may have a shank wall thickness in the range 1.0 mm to 1.5 mm.

According to a sixth aspect of the invention there is provided a riveted joint comprising a UHSS layer and a non-UHSS layer formed using a self-piercing rivet according to the fifth aspect of the invention, wherein a lower portion of a shank of the rivet has flared outwards and is interlocked in the non-UHSS layer, and wherein an upper portion of the shank is in contact with the UHSS layer around a circumference of the shank.

The non-UHSS layer may form a layer below a slug of UHSS and encloses a lower surface of the joint.

According to a seventh aspect of the invention there is provided a self-piercing rivet for forming a joint between a UHSS layer and a non-UHSS layer, wherein the self-piercing rivet comprises a head and a shank, the shank comprising a lower shank portion, a middle shank portion and an upper shank portion, and wherein the middle shank portion has a diameter which is less than the diameter of the upper shank portion and the lower shank portion.

A maximum diameter of the upper shank portion may be the same as the diameter of the lower shank portion.

The middle shank portion may taper inwardly. The upper shank portion may taper outwardly.

The middle shank portion may be generally cylindrical.

According to an eighth aspect of the invention there is provided a riveted joint comprising a UHSS layer and a non-UHSS layer formed using a self-piercing rivet according to the seventh aspect of the invention, wherein a lower portion of a shank of the rivet is interlocked in the non-UHSS layer, wherein an upper portion of the shank is in contact with the UHSS layer around a circumference of the shank, and wherein a slug has been cut from the UHSS layer and a slug has been cut from the non-UHSS layer, and wherein both slugs have been removed from the joint such that a bottom end of the shank is exposed.

According to a ninth aspect of the invention there is provided a self-piercing rivet for forming a joint between a UHSS layer and a non-UHSS layer, wherein the self-piercing rivet comprises a head and a shank, the shank comprising a lower shank portion, and an upper shank portion, a recess extending at least part way into the lower shank portion, wherein an outer diameter of the upper shank portion is greater than an outer diameter of the lower shank portion.

The outer diameter of the upper shank portion may be up to 12% larger than the outer diameter of the lower shank portion.

The recess may be substantially conical.

The upper shank portion may meet the lower shank portion at a transition, the transition being tapered (e.g. chamfered or rounded).

According to a tenth aspect of the invention there is provided a riveted joint comprising a UHSS layer and a non-UHSS layer formed using a self-piercing rivet according to the ninth aspect of the invention, wherein a lower portion of a shank of the rivet has flared outwards and is interlocked in the non-UHSS layer, wherein an upper portion of the shank is in contact with the UHSS layer around a circumference of the shank, and wherein a slug has been cut from the UHSS layer and a slug has been cut from the non-UHSS layer, and wherein both slugs have been removed from the joint such that a bottom end of the shank is exposed.

BRIEF DESCRIPTION OF THE DRAWINGS

Specific embodiments of the invention will now be described, by way of example only, with reference to the accompanying drawings in which.

DETAILED DESCRIPTION

Figure 1:
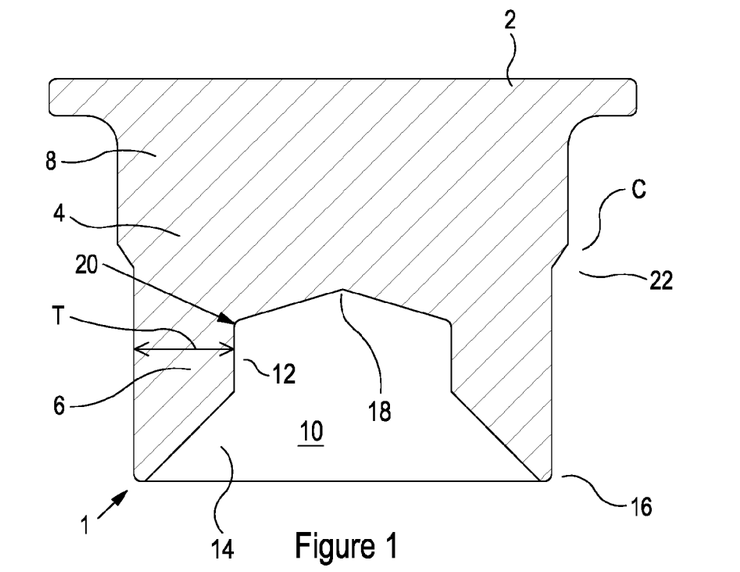
FIG. 1 depicts in cross-section a rivet according to an embodiment of the invention.

A rivet 1 according to an embodiment of the invention is depicted in FIG. 1. The rivet comprises a head 2 and shank 4. In a conventional rivet the shank has a cylindrical outer surface which extends from a bottom end of the shank to a top end of the shank where the shank meets the head (a radiused connection or a chamfer may be provided between the shank and the head). In contrast to this, in the rivet depicted in FIG. 1 the shank has a lower portion 6 with a first diameter and an upper portion 8 with a second diameter which is larger than the diameter of the lower portion. The diameter of the upper portion 8 may for example be between 1 and 12% greater than the diameter of the lower portion 6. As is explained in more detail further below, the increased diameter of the upper portion 8 may correspond with flaring of the lower portion 6 of the shank 4 which occurs when the rivet penetrates through an upper UHSS sheet. The hole cut into the UHSS sheet by the flared lower portion 6 of the shank 4 may have a diameter which is 1-12% larger than the diameter of the lower portion of the shank before rivet insertion. The increased diameter upper portion 8 of the rivet shank will fill the hole which was cut by the flared lower portion 6 of the shank 4. This provides better engagement between the inserted rivet and the upper UHSS sheet than would otherwise be the case. In particular, it avoids the creation of a gap between the rivet shank and the UHSS sheet which extends from the head downwardly along the rivet shank. Such a gap is undesirable because a gap provides a readily accessible path for moisture ingress and a potential for subsequent galvanic corrosion. In addition, the presence of the gap will significantly impair the fatigue life of the joint A bottom end of the rivet 1 is provided with a recess 10 (which may alternatively be referred to as a rivet bore). The recess 10 extends upwards into the lower portion 6 of the shank. The recess 10 does not extend as far as the upper portion 8 of the shank. The recess 10 may have a depth which is less than half of the length of the rivet 1. The recess 10 is dimensioned such that some flaring of the lower portion 6 of the shank occurs when the rivet is inserted into a UHSS workpiece. The recess may have the form depicted in FIG. 1 or may have some other form. The recess 10 may comprise a chamfered 14 lower portion, a cylindrical middle portion 12 and a conical upper portion 18.

The chamfered lower portion 14 may define an included angle H in the range 60-120 degrees. The chamfered lower portion 14 may for example define an included angle of around 90 degrees (e.g. plus or minus 10 degrees). The chamfered lower portion 14 may promote flaring of the shank 4. If the lower portion 14 of the shank 4 were to extend axially downwards instead of being chamfered, then there would be a risk that no flaring of the shank would take place, as a result of which there would be no interlock of the rivet in the lower sheet of the joint. Such a lack of flaring may be referred to as 'staking'. Although the lower portion 14 of the shank 4 should not extend axially downwards, it is not essential that the lower portion is chamfered. The lower portion 14 may have some other inwardly tapering form. For example, the lower portion may have a curved inwardly tapering form (e.g. having a concave curve).

The cylindrical middle portion 12 connects the chamfered lower portion 14 to the conical upper portion 18. In the depicted embodiment, the conical upper portion 18 subtends an angle of around 15 degrees relative to a plane perpendicular to an axis A of the rivet. However, the conical upper portion may subtend some other angle. The conical upper portion 18 in the depicted embodiment joins the cylindrical middle portion 12 via a fillet radius 20. The fillet radius 20 may for example have a radius of around 0.4 millimetres (e.g. between 0.2 millimetres and 0.6 millimetres).

In other embodiments, the upper portion of the recess may have some other suitable shape. For example, the upper portion may be substantially planar (e.g. perpendicular to the axis A of the rivet). For example, the upper portion may be domed (i.e. with a curved rather than conical surface). The upper portion may comprise a combination of planar, conical and domed portions. For example, the upper portion may comprise a domed inner portion and an outer frusto-conical portion. The upper portion may comprise a combination of conical portions with different taper angles, or may comprise a combination of domed portions with different curvatures. The upper portion may be axially symmetric.

A tip 16 of the shank 4 at a lowermost end of the chamfer may be rounded, e.g. as depicted. As noted above, the chamfered lower portion 14 of the recess 10 promotes flaring of the shank. Rounding of the tip may provide some control over the degree to which the rivet shank flares. A larger radius of curvature at the tip 16 will reduce rivet shank flaring, whereas a smaller radius of curvature at the tip will increase rivet shank flaring. The rounded tip 16 may have a radius of curvature which is between 0.05 mm and 0.3 mm. It may be difficult to provide a radius of curvature below 0.05 mm when using conventional rivet fabrication techniques. A radius of curvature greater than 0.3 mm may cause insufficient flaring to occur. In general, the radius of curvature of the tip may be selected based upon a desired degree of rivet flaring, taking into account tensile strength of workpiece materials that will be joined.

In an alternative arrangement (not depicted), a foot of the shank may comprise a flat surface which is substantially perpendicular to the axis A of the rivet. An outer edge of the flat surface will comprise a tip which may have a radius of curvature as described above.

The diameter of the recess 10 will determine the thickness T of a wall of the lower portion 6 of the shank 4. The wall thickness will influence the extent to which the lower portion 6 of the shank flares when the rivet 1 is inserted into a workpiece. If the wall is too thin then the shank may buckle when the rivet is inserted into a UHSS sheet. Conversely however, If the wall is too thick no flaring or insufficient flaring of the lower portion 6 of the shank 4 will occur and as a result a strong joint will not be formed.

In one embodiment, as depicted in FIG. 1, the lower portion 6 of the shank 4 may have a diameter of 5.5 millimetres, and the diameter of the cylindrical portion of the recess 10 may be between 2.5 mm and 3.5 mm. This provides a shank wall thickness in the range 1.0 mm to 1.5 mm. This range of wall thicknesses provides some flaring of the lower portion 6 of the shank 4 without the shank suffering from buckling (for a wide range of material types, including UHSS).

In other embodiments the rivet shank may have a diameter between 5 millimetres and 6 millimetres. The width of the wall of the cylindrical part of the lower portion 6 may for example be in the range 1.0 mm to 1.5 mm. In general, the ratio of wall thickness to shank diameter may be between 0.16 and 0.3.

On the outer surface of the shank 4 there is a transition 22 between the lower portion 6 and the upper portion 8 of the shank. This transition 22 may have various forms. In FIG. 1 the transition 22 is in the form of a chamfer. The chamfer forms an angle C with respect to a line which is parallel to the axis A of the rivet 1. The angle C may for example be between 20 and 45 degrees (e.g. around 30 degrees). At this range of angles the upper portion 8 of the shank 4 will enter a pierced hole in an upper UHSS sheet more readily and at lower forces than if the transition for example had an angle of 90 degrees. If the angle of the transition was significantly less than 20 degrees then the upper shank of the rivet may offer less engagement with the upper UHSS sheet. This not desirable because engagement with the upper UHSS sheet is preferred (poor engagement may adversely affect the impair the fatigue life of the joint). A transition 22 with an angle of around 30 degrees (e.g. +/−5 degrees) may be preferred because it is easier to forge than other angles.

Figure 2:
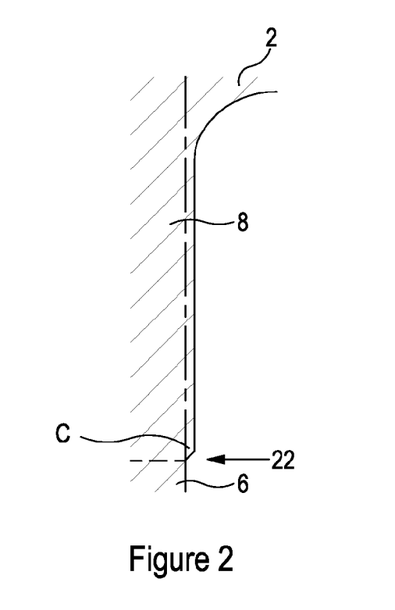
FIG. 2 depicts in part of a rivet according to an alternative embodiment of the invention.

A transition 22 is depicted in an enlarged view in FIG. 2. The transition is again in the form of a chamfer, although the chamfer 22 has a larger angle C than the chamfer of FIG. 1.

In an alternative embodiment (not depicted), the transition between the lower portion 6 and the upper portion 8 of the shank 4 may be rounded.

A fillet radius is provided between the upper portion 8 of the shank 4 and the head 2. The fillet radius may for example be in the range 0.2 mm to 1.2 mm. A filet radius is desirable, because if no filet radius is present then there may be a tendency for the rivet to crack at the connection between the shank and the head. Providing a filet radius reduces the likelihood of rivet cracking, and the larger the radius the more effective it is in reducing the likelihood or rivet cracking. However, when inserting the rivet into workpieces with high tensile strength such as UHSS a larger filet radius will significantly increase the force needed to insert the rivet into the workpiece. A filet radius in the range 0.2 mm to 1.2 mm provides a balance between these two competing aspects.

Figure 3A:
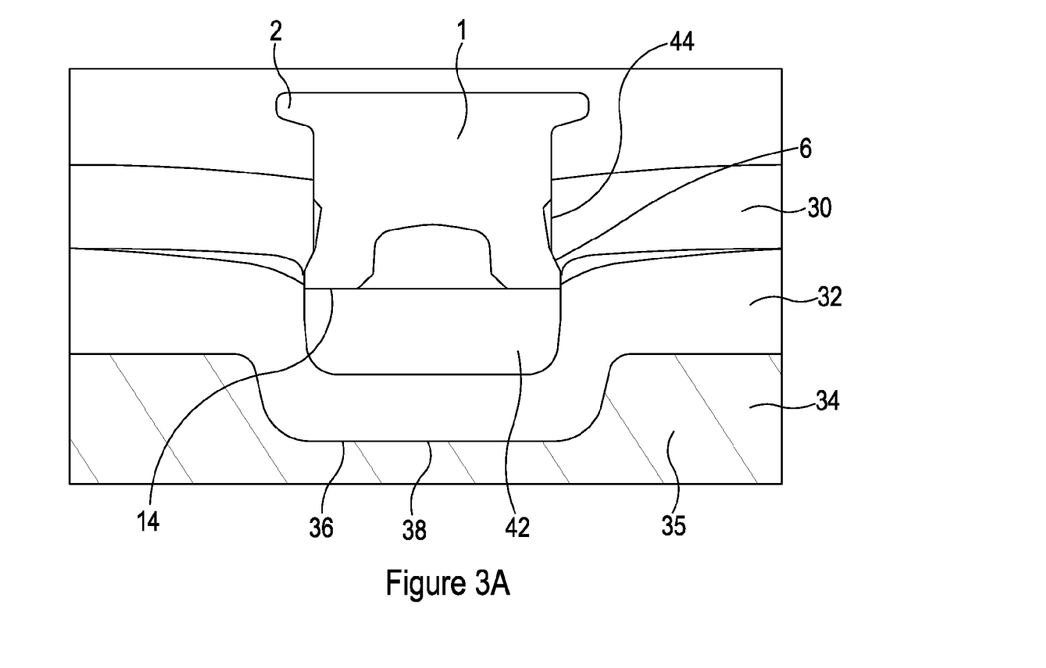
FIGS. 3A and 3B depict in cross-section forming a joint between two sheets of material made using a rivet according to an embodiment of the invention.
Figure 3B:
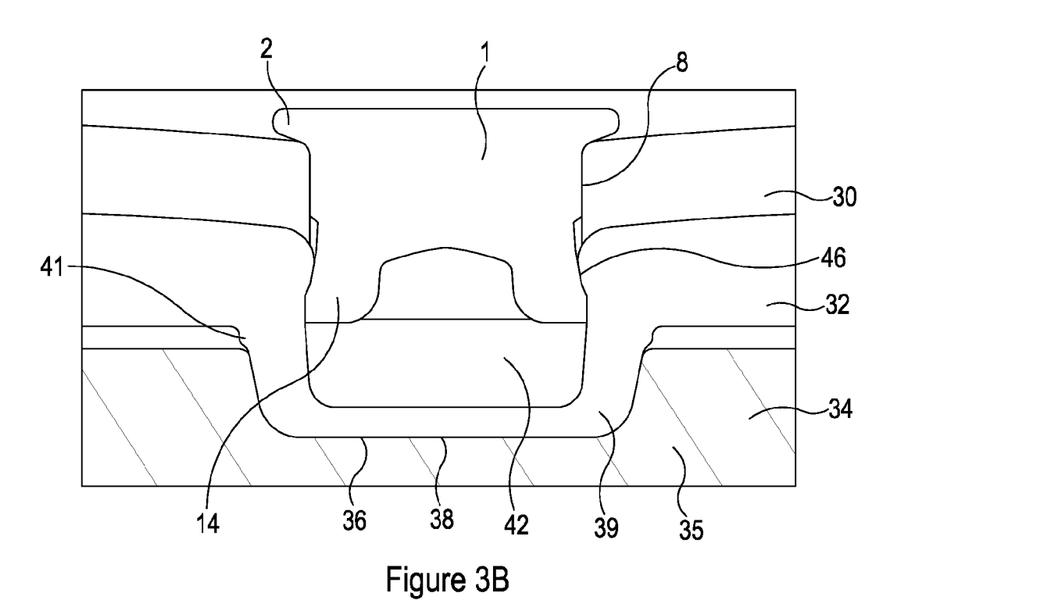

The head 2 may for example have a diameter of around 7.75 mm. This is advantageous because it is a standard rivet head diameter, and thus allows the rivet to be used in already installed rivet insertion tools. The head 2 may alternatively have some other diameter. A bottom end of the shank may for example have an outer diameter of around 5.5 mm. The bottom end of the shank may have a smaller outer diameter, e.g. as small as 5 mm. If the bottom end of the shank were to have a smaller outer diameter than 5 mm then this may make the bottom end of the shank too weak to penetrate into UHSS without buckling. The bottom end of the shank may have a larger outer diameter, e.g. up to 7 mm. If the bottom end of the shank were to have a larger outer diameter than 7 mm then the top end of the shank may have an outer diameter which is too close in size to the diameter of the rivet head. If the difference in diameter between the top end of the shank and the rivet head is less than around 0.3 mm then this may not be sufficient to allow a good interlock to be formed between the rivet head and a workpiece. Therefore, the outer diameter of the bottom end of the shank, and the increase of diameter of the shank, taken together may be such that the outer diameter at the top end of the shank does not exceed 7.4 mm FIGS. 3A and 3B depict schematically forming a joint using the rivet depicted in FIGS. 1 and 2. The rivet 1 is inserted into a workpiece comprising a UHSS sheet 30 and an aluminium sheet 32 located over a die 34. The rivet may be inserted using a rivet insertion tool as described in U.S. Pat. No. 6,692,213, which is herein incorporated by reference. The die 34 comprises a body 35 provided with a generally cylindrical recess 36 in its upper surface. The die may include a rod (not depicted) which extends from an opposite surface in order to allow the die to be held securely in a die holder. Examples of dies are described in U.S. Pat. No. 8,671,726, which is herein incorporated by reference. The recess 36 of the depicted die has a flat bottom surface 38. In some embodiments a non-flat bottom surface may be provided. However, a flat bottom surface is preferred because a protrusion such as a pip extending from the bottom surface of the die may cause the lowermost sheet of a joint to be too thin.

Prior to insertion of the rivet 1 into the sheets 30, 32, the sheets are flat with a lower surface of the bottom sheet 32 being in contact with an upper surface of the die 34. The recess 36 of the die is empty.

FIG. 3A depicts the rivet 1 after it has been inserted into the UHSS upper sheet 30. The rivet 1 has cut a slug 42 from the upper sheet. The lower portion 6 of the shank flared outwardly when the rivet 1 cut into the upper sheet 30. The chamfered lower portion 14 of the rivet 1 has been flattened against the slug 42 (although an upper end of the chamfered lower portion 14 remains).

Because the rivet shank 4 flared outwardly when it cut into the UHSS upper sheet 30, the slug 42 of UHSS (and a hole 44 left behind by the slug) has a diameter which is greater than an unflared diameter of the lower portion 6 of the rivet shank. This flaring of the lower portion 6 of the rivet shank 4 as it cuts into the upper sheet 30 goes against the conventional understanding of how a self-piercing rivet joint should be made. The conventional understanding is that the rivet should not flare during insertion through an upper material sheet, and should only flare when it enters a lower material sheet (the flaring being promoted by the die). This is because flaring in the lower sheet provides an interlock with the lower sheet (interlock with the upper sheet is provided by the head of the rivet). However, the inventors have understood that flaring of the shank during passage through the upper sheet 30 may be allowed to occur, whilst still forming a strong joint between the upper and lower sheets 30, 32.

FIG. 3B depicts the rivet after it has been inserted into the lower sheet 32, i.e. when the joint has been completed. After it travelled through the upper sheet 30, the lower portion 6 of the rivet entered the lower sheet 32. The slug 42, because it is formed from UHSS, did not deform and travel up into the recess 10 of the rivet (as would occur if the upper sheet were formed from a ductile material such as aluminium). Instead, the slug 42 passed downwards into the lower sheet 32. In the depicted example the lower sheet 32 is formed from aluminium. The lower sheet material (aluminium) is compressed between the slug 42 and the bottom surface 38 of the die recess 36. The lower sheet material flowed sideways and away from a zone between the slug 42 and the die 34. The geometry of the die recess 36 promoted flow of the lower sheet material 32 toward the lower portion 6 of the shank. The geometry of the die recess 36 is discussed in detail further below. The lower sheet material 32 has come into contact with an inwardly tapering part 46 of the lower portion 6 of the shank 4. This may be referred to as back-filling of a space behind a maximum diameter part of the lower shank portion 6. Back-filling may be considered to mean radially inward movement of the lower sheet material 32 such that the lower sheet material contacts an inwardly tapering part 46 of the rivet shank 4. This back-filling of the inwardly tapering part 46 advantageously provides an interlock between the rivet shank 4 and the lower sheet 32. No flaring of the rivet shank 4 into the lower sheet 32 is required in order to form an interlock with the lower sheet.

The upper portion of the shank 8 is sufficiently large that it is in contact with the UHSS sheet 30 around a circumference of the shank.

A button 39 of lower sheet material flow has been formed. The button 39 has an outer surface which generally corresponds in shape with the geometry of the die recess 36. However, the button 39 includes ridge 41 which extends around the button where the button meets a planar part of the lower sheet 32. The ridge 41 is formed because some lower sheet material is forced out of the die recess 36 as the rivet is inserted into the lower sheet 32.

Figure 4:
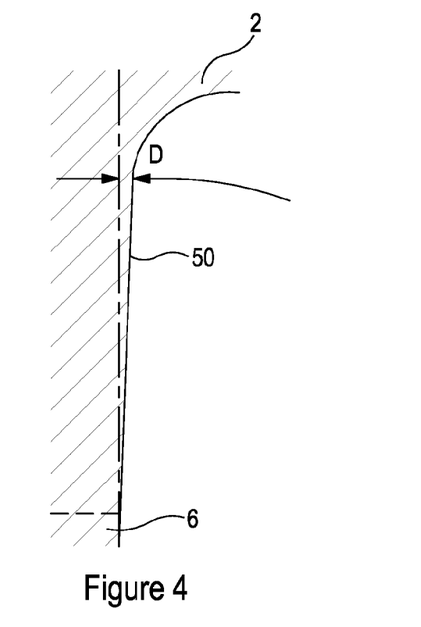
FIG. 4 depicts part of a rivet according to an alternative embodiment of the invention.

In the above described embodiment the shaft 4 of the rivet 1 comprises a lower portion 6 with a first diameter and an upper portion 8 with a second diameter which is larger than the diameter of the lower portion. In that embodiment both the lower portion 6 and the upper portion 8 are cylindrical and have outer surfaces which are parallel with the axis A of the rivet 1. In an alternative embodiment of the invention, the upper portion of the rivet may be tapered instead of being cylindrical. An example of the upper portion of such an embodiment is depicted in FIG. 4. From a comparison between FIGS. 2 and 4, it may be seen that there is chamfered transition between the lower portion and upper portion. Instead, the upper portion 50 is tapered to meet the lower portion 6 (the lower portion is not tapered). In the depicted example the angle D of the taper, relative to a line parallel to an axis of the rivet, is 1.3 degrees. The taper begins where the lower portion 6 ends and the upper portion 50 begins. The taper is such that the upper portion 50 of the shank has a minimum diameter of 5.5 millimetres and has a maximum diameter of 5.6 millimetres. The maximum diameter of the shank 4 is considered to be the diameter immediately before a fillet radius which connects the shank 4 to the head 2 of the rivet. In general, the angle D of the taper may be such that it provides an increase of the diameter of the upper portion 50 of the shank of between 1% and 12%. This may correspond with an angle D of the taper of between around 0.5 degrees and around 18 degrees. If the angle was significantly smaller than 0.5 degrees then an upper end of the shank upper portion 50 would not have a sufficiently large diameter to fill a hole cut by the flared rivet in the UHSS upper sheet of a joint. If the angle was significantly greater than 18 degrees then the upper end of the shank upper portion 50 would be bigger than the hole cut by the flared rivet in the UHSS upper sheet. Pushing the upper end of the shank upper portion 50 into the UHSS upper sheet would then require the UHSS to be pushed outwards and may cause damage to the rivet.

Figure 5:
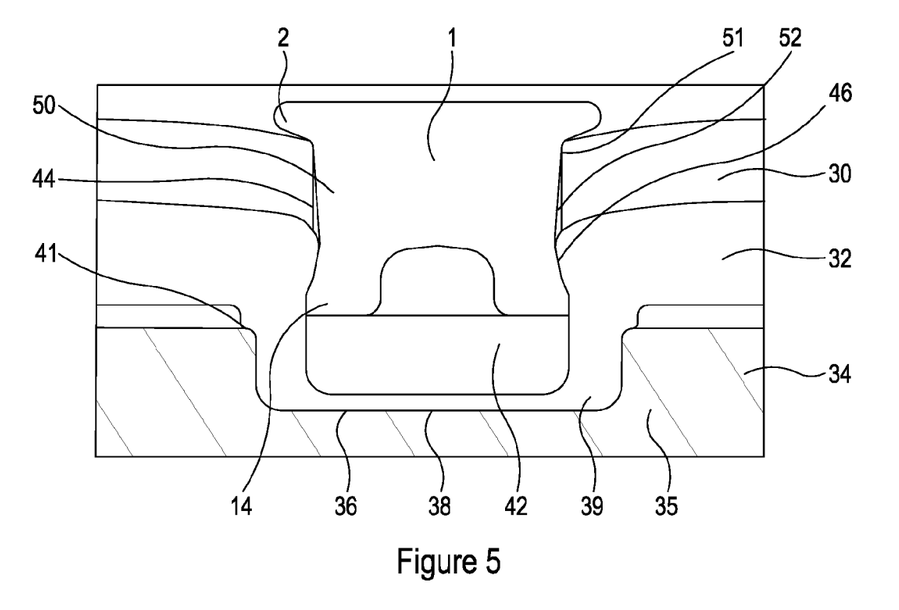
FIG. 5 depicts in cross-section a joint formed using a rivet according to an alternative embodiment of the invention.

In use, the rivet with the tapered upper portion 50 functions in a similar manner to the rivet depicted in FIGS. 1-3. FIG. 5 depicts the rivet after it has been used to form a joint in an upper sheet 30 and a lower sheet 32 (the upper sheet 30 being UHSS). As may be seen, an upper end 51 of the tapered upper portion 50 of the rivet shank 4 is in contact with the upper sheet 30 around a circumference of the shank. This forms a stronger joint between the upper sheet and the lower sheet 32. The upper portion 50 of the rivet shank 4 is in contact with the upper sheet 30, and as a result a secure connection is provided between the rivet shank and the upper sheet. This provides improved fatigue life compared with for example a joint in which there is a gap between the rivet shank and the upper sheet (i.e. the rivet shank has little or no contact with the upper sheet). Although there is a gap between a lower end 52 of the tapered upper portion 50 of the rivet shank 4 and the upper sheet 30, this does not have a significant effect upon the fatigue life of the joint. The connection between the upper end 51 of the tapered upper portion 50 and the upper sheet 30 is sufficient to provide the improved fatigue life. In addition, there is no opening between the rivet shank 4 and the upper sheet 30 through which moisture could enter the joint. Moisture ingress is undesirable because it may lead to subsequent galvanic corrosion.

A button 39 of lower sheet material flow has been formed. The button 39 has an outer surface which generally corresponds in shape with the geometry of the die recess 36. In common with the embodiment depicted in FIG. 3B, the button 39 includes ridge 41 which extends around the button where the button meets a planar part of the lower sheet 32. The ridge 41 is formed because some lower sheet material is forced out of the die recess 36 as the rivet is inserted into the lower sheet 32.

An advantage of the embodiment of FIG. 5 compared with the embodiment of FIGS. 1-3 is that because there is less contact between the rivet shank and the upper sheet of the workpiece, setting force needed to insert the rivet into the workpiece may be reduced. This may be advantageous if the upper sheet of the workpiece has a particularly high tensile strength (e.g. more than 1200 HV and/or if the upper sheet of the workpiece is particularly thick (e.g. 2.5 mm or more). In general, embodiments in which the outer surface of the rivet shank is tapered may require less insertion force than embodiments in which the shank has an upper portion with a larger diameter than a lower portion. This is because there is less contact between the rivet shank and the upper sheet of the workpiece.

Figure 6:
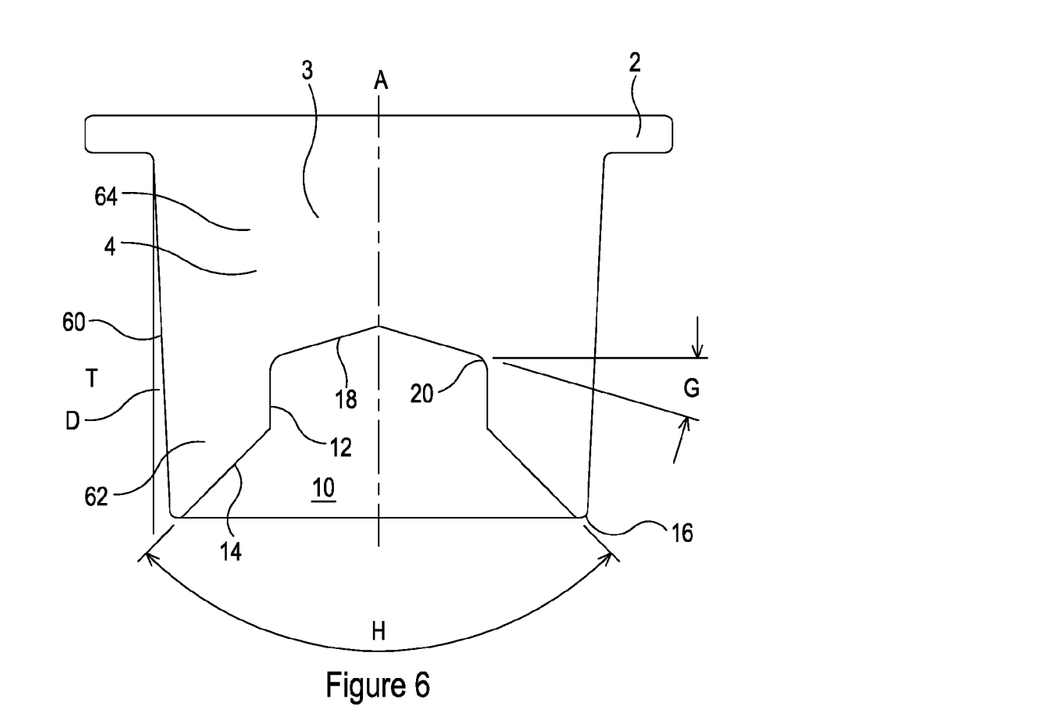
FIG. 6 depicts in cross-section a rivet according to an alternative embodiment of the invention.

A rivet 3 according to a further embodiment of the invention is depicted in FIG. 6. As will be appreciated from a comparison of this rivet with the rivet depicted in FIG. 1, the rivet depicted in FIG. 6 includes many of the features of the rivet depicted in FIG. 1. For example, the recess 10 has the same configuration, the tip 16 has the same configuration, and the head 2 has the same configuration. However, the outer surface of the shank 4 differs from that of the shank depicted in FIG. 1. Specifically, instead of having a cylindrical lower portion and an upper portion with a larger diameter, the shank 4 has a tapered surface 60. The tapered surface 60 of the shank 4 extends from the tip 16 of the shank to a fillet radius which connects the shank 4 to the head 2 of the rivet. The tapered shank 60 has a taper angle D with respect to a line parallel to an axis A of the rivet. The taper angle D may be selected such that the diameter of a top end of the tapered shank is between 1 and 12% greater than the diameter of a bottom end of the tapered shank. The tapered shank 60 may advantageously at least partially fill a hole formed in an upper UHSS sheet cut by a flared shank of the rivet 3. This may be understood by referring to FIG. 6 in combination with FIG. 5 (although FIG. 5 depicts a partially tapered rivet after insertion, the rivet has the same form as fa fully tapered rivet after insertion). A, a hole 44 cut in an upper sheet of UHSS 30 is larger than the unflared diameter of the bottom end of the shank of the rivet 3 of FIG. 6 because some flaring of the shank 4 occurs when the rivet cuts through the upper sheet. The tapered shank 60 provides an upper end of the shank 4 with a larger diameter than the lower end (before rivet flaring), and thus an upper end of the shank is in contact with the UHSS sheet 30 around a circumference of the shank. This provides the advantages mentioned further above in relation to the partially tapered shank.

Filling of the hole 44 in the UHSS upper layer 30 by the tapered shank 60 may be less complete than filling of the hole by a stepped shank of the type depicted in FIG. 1. In some instances it may desirable to fill the hole 44 as completely as possible, for example to maximise fatigue life and minimise the potential for moisture ingress.

The recess in the rivet shank may have the form depicted in FIG. 6 or may have some other form. The recess 10 may comprise a chamfered 14 lower portion, a cylindrical middle portion 12 and a conical upper portion 18. The chamfered lower portion 14 may define an included angle H in the range 60-120 degrees. The chamfered lower portion 14 may for example define an included angle of around 90 degrees (e.g. plus or minus 10 degrees). As noted further above, the chamfered lower portion 14 promotes flaring of the shank 4. The cylindrical middle portion 12 connects the chamfered lower portion 14 to the conical upper portion 18.

In the depicted embodiment, the conical upper portion 18 subtends an angle G of around 15 degrees relative to a plane perpendicular to an axis A of the rivet. However, the conical upper portion may subtend some other angle. The conical upper portion 18 in the depicted embodiment joins the cylindrical middle portion 12 via a fillet radius 20. The fillet radius 20 may for example have a radius of around 0.4 millimetres (e.g. between 0.2 millimetres and 0.6 millimetres).

In other embodiments, the upper portion of the recess may have some other suitable shape. For example, the upper portion may be substantially planar (e.g. perpendicular to the axis A of the rivet). For example, the upper portion may be domed (i.e. with a curved rather than conical surface). The upper portion may comprise a combination of planar, conical and domed portions. For example, the upper portion may comprise a domed inner portion and an outer frusto-conical portion. The upper portion may comprise a combination of conical portions with different taper angles, or may comprise a combination of domed portions with different curvatures. The upper portion may be axially symmetric.

A tip 16 of the shank 4 at a lowermost end of the chamfer may be rounded, e.g. as depicted. As noted above, the chamfered lower portion 14 of the recess 10 promotes flaring of the shank. Rounding of the tip may provide some control over the degree to which the rivet shank flares. A larger radius of curvature at the tip 16 will reduce rivet shank flaring, whereas as smaller radius of curvature at the tip will increase rivet shank flaring. The rounded tip 16 may have a radius of curvature which is between 0.05 mm and 0.3 mm. It may be difficult to provide a radius of curvature below 0.05 mm when using conventional rivet fabrication techniques. A radius of curvature greater than 0.3 mm may cause insufficient flaring to occur. In general, the radius of curvature of the tip may be selected based upon a desired degree of rivet flaring, taking into account tensile strength of workpiece materials that will be joined.

In an alternative arrangement (not depicted), a foot of the shank may comprise a flat surface which is substantially perpendicular to the axis A of the rivet. An outer edge of the flat surface will comprise a tip which may have a radius of curvature as described above.

The shank 4 may be considered to comprise a lower portion 62 and an upper portion 64. The lower portion 62 is the portion of the shank 4 within which the recess 10 extends. The upper portion 64 is the portion of the shank 4 within which the recess 10 does not extend. The diameter of the recess 10, combination with the angle of the tapered shank surface 60, will determine the thickness T of a wall of the lower portion 62 of the shank 4. The wall thickness will influence the extent to which the lower portion 6 of the shank flares when the rivet 1 is inserted into a workpiece. If the wall is too thin then the shank may buckle when the rivet is inserted into a UHSS sheet. Conversely however, If the wall is too thick no flaring or insufficient flaring of the lower portion 6 of the shank 4 will occur and as a result a strong joint will not be formed.

The shank 4 may have a minimum diameter of 5.0 mm and may have a maximum diameter of 6.0 mm. The diameter of the cylindrical portion 12 of the recess 10 may be between 2.5 mm and 3.5 mm. This provides a shank wall thickness in the range 1.0 mm to 1.5 mm. This range of wall thicknesses provides some flaring of the shank 4 without the shank suffering from buckling (for a wide range of material types, including UHSS). In general, the ratio of wall thickness to shank diameter may be between 0.16 and 0.3.

A rivet according to the invention experiences some flaring of a lower shank portion when it enter an upper sheet of UHSS. This cuts a hole in the upper UHSS sheet which is larger than the unflared diameter of the lower portion of the shank. In embodiments of the invention the upper portion of the shank has a larger diameter than the unflared lower portion of the shank, and thus more effectively fills that hole than would otherwise be the case. When the rivet enters a lower sheet of more ductile material the lower shank portion has already undergone some flaring. The rivet may be referred to as having a pre-flared lower shank portion. A die promotes radially inward flow of the lower sheet material towards the pre-flared lower shank portion. Lower sheet material thus comes into contact with an inwardly tapering part of the rivet shank. This may be referred to as back-filling and provides an interlock between the rivet and the lower sheet. Engagement with the upper sheet is provided by the head of the rivet, the head having a diameter which is larger than the diameter of the hole cut into the upper sheet. Thus, the upper sheet and lower sheet are compressed together by the flared lower shank portion and the head, thereby providing a strong joint between the sheets. In addition, in the example depicted in FIGS. 3 and 5 (and for other embodiments not depicted), the upper portion or upper end of the rivet shank engages with the upper sheet. This provides contact between the rivet shank and the UHSS layer around a circumference of the shank. Because contact is provided around the circumference of the shank, no gap is present which could allow undesirable moisture ingress. The contact around the circumference of the shank also provides improved resistance to fatigue (improved fatigue lifetime).

The depth of the recess in the embodiments of FIGS. 1 and 6 is 2.25 mm. The total length of the rivet is 5.25 mm. However, in other embodiments of the invention the recess 10 of the rivet may have a different depth and may have a different shape from that depicted in FIGS. 1 and 6.

The recess promotes flaring of the rivet. The depth of the recess may for example be less than half of the length of the rivet. The depth of the recess may for example be up to 3 mm. The recess may have any depth smaller than 3 mm. This recess introduces some weakness into the rivet, and thus the depth of the recess in a rivet may be selected based upon the tensile strength and the depth of the UHSS upper layer into which the rivet will be inserted. For a thicker UHSS layer or a stronger UHSS layer a shallower recess depth may be selected, and for a thinner UHSS layer or a weaker UHSS layer a deeper recess depth may be selected. A deeper recess may promote more flaring of the rivet shank, which in turn may provide a stronger interlock between the rivet shank and a lowermost sheet of a workpiece. These competing requirements may be balanced against each other, for example by performing test rivet insertions using samples of the materials that will be joined in a production environment.

In an embodiment, the recess may for example comprise a chamfer 14 (e.g. with an included angle of 60-120 degrees, preferably around 90 degrees+/−10 degrees). The recess may comprise an inward taper. The chamfered or tapered recess may terminate at an upper end of the recess which is formed by a flat surface that extends substantially perpendicular to an axis of the rivet. In other embodiments the upper end of the recess may be formed by a domed portion or may be formed by a conical portion. The conical portion may have a larger included angle than the chamfered or tapered portion. The conical portion may have an included angle of 140 degrees or more.

In another embodiment an upper end of the recess may comprise a combination of two or more forms. For example, the upper end of the recess may comprise an inner domed portion which is surrounded by an outer flat portion or conical portion (e.g. with an included angle of 140 degrees or more). The inner domed portion may for example have a diameter of less than 2 mm, e.g. around 1 mm. The depth from a tip of the shank to the outer conical or flat portion at the upper end of the recess may determine the depth of the chamfered or tapered portion of the rivet. This depth will thus have a substantial effect upon flaring of the shank of the rivet. The inner domed portion may have a lesser effect upon flaring of the shank of the rivet. The inner domed portion is one example of a more general central recess or bore with a relatively narrow diameter (e.g. 2 mm or less).

The rivet may have a length of 4.5 mm or more (less than 4.5 mm may not be sufficient to provide an effective joint between sheets of a workpiece). The rivet may for example have a length of up to 7 mm. The rivet may have a length in excess of 7 mm, e.g. up to 9 mm. Such longer rivets may be used when forming a joint in an unusually thick workpiece (a rivet length of up to 7 mm is sufficient for most workpieces).

The die 34 may have a recess 36 which has a volume which is less than the volume of a conventional die used in convention self-piercing riveting. For example, when inserting a conventional self-piercing with a 5.5 mm shank diameter into an upper sheet 30 of 1500 MPa UHSS with a thickness of 2 mm and a lower sheet 32 of aluminium with a thickness of 2.5 mm, a die having a diameter of 10.0 mm and a depth of 2.0 mm would be used. This die may be referred to as a DF10-200 die, and provides a die volume of 160 mm$^3$. However, when self-piercing rivet insertion according to the invention is used, the die may have a diameter of 8.0 mm and may have a depth of 2.0 mm. This die may be referred to as a DF08-200 die, and provides a die volume of 103 mm$^3$. This die has a volume which is 64% of the volume of the conventional die. The volume of the die recess is reduced by reducing the diameter of the die recess (the depth of the die recess may remain unchanged).

In general, when forming a conventional self-piercing rivet joint a die may be selected which has a diameter that is at least 3 mm greater than the diameter of the rivet shank (as measured before rivet insertion takes place). In embodiments of the invention, a die with a smaller diameter may be selected. This is because the smaller diameter die increases the force with which material from the lowermost workpiece is pushed out of the die, and thus promotes more flow of material into space behind the flared shank (which may be referred to as back-filling). In embodiments of the invention die may be selected which has a diameter that is no more than 2.5 mm greater than the diameter of the rivet shank (as measured at the lowermost end of the rivet shank before rivet insertion takes place). The die may have a diameter which is no more than 2 mm greater than the diameter of the rivet shank. The die may have a diameter which is between 1.5 mm and 2.5 mm greater than the diameter of the rivet shank (e.g. around 2 mm). The die diameter which is selected may be influenced by the thickness of the lowermost sheet of the workpiece, with a larger die diameter being used for a thicker workpiece (in order to allow the workpiece to be accommodated). In one example, the lowermost end of the rivet shank may have a diameter of 5.5 mm before rivet insertion. A die may be selected which has a diameter of 8 mm if the workpiece has a thick lowermost sheet (e.g. 2.5 mm or more). A die may be selected which has a diameter of 7.5 mm if the workpiece is not thick (e.g. less than 2.5 mm). A die may be selected which has a diameter of 7 mm. However, selecting such a die may increase the forces required to form the joint (material of the lowermost sheet must travel through a narrow gap) without significantly improving the interlock between the lowermost sheet and the rivet shank. The above examples refer to die diameters which increment in size by 0.5 mm. Other die diameters may be used, e.g. with a diameter which is 7 mm and 8 mm).

In general, the volume of the die may for example be less than 80% of the volume of a conventional die, or less than 65% of the volume of a conventional die, and may be less than 50% of the volume of a conventional die.

In conventional self-piercing riveting the rivet shank flares outwards as the rivet approaches the die. However, in embodiments of the invention little or no flaring of the rivet shank occurs as the rivet approaches the die. Instead, the slug 42 is pushed downwards by the rivet. This downward force places the lower sheet material 32 under significant compression, and this causes lower sheet material to extrude out from beneath the slug. Because the diameter of the die recess is smaller than a conventional die, the lower sheet material is under significant compression as it passes between the slug 42 and sides of the die. As the lower sheet material leaves the gap between the slug and the sides of the die it is able to expand and flow radially. The lower sheet material flows radially inwards and radially outwards. As a result of the radially inward flow of the lower sheet material, lower sheet material flows towards and contacts the inwardly tapering part 46 of the rivet shank 4. Thus, the lower sheet material 32 at least partially back-fills a void created by the pre-flared tip of the rivet passing into the lower sheet. This provides a good interlock of the rivet with the lower sheet 32 and thus provides a strong join.

Figure 7:
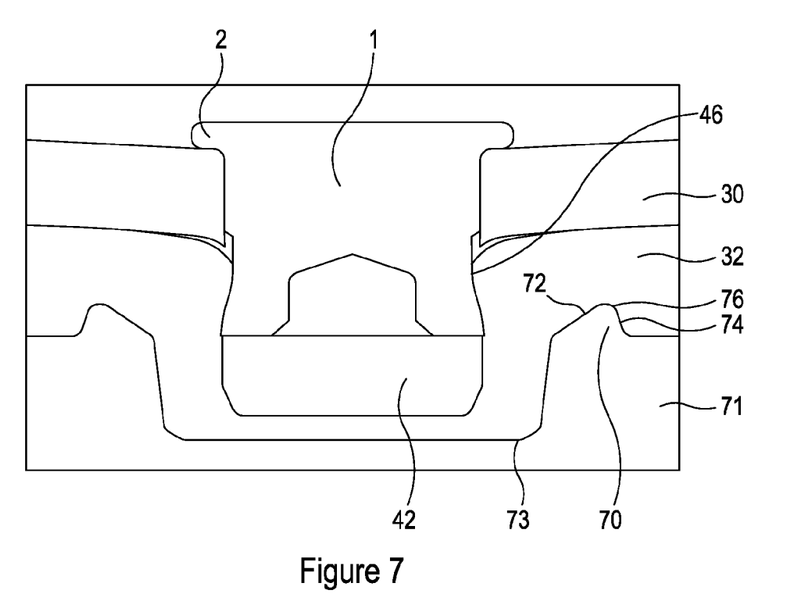
FIG. 7 depicts in cross-section an alternative joint between two sheets of material made using a rivet according to an embodiment of the invention.

A die 71 with an alternative configuration is depicted in FIG. 7. In this configuration an annular ridge 70 extends around an outer edge of a recess 73 of the die. The annular ridge 70 has a chamfered inner face 72 which is generally directed towards the rivet. An upper end of the chamfered face 72 is connected to an outer step 74 by a fillet radius 76. The annular ridge 70 promotes flow of the lower sheet material 32 radially inwards (towards the inwardly tapering part 46 of the rivet shank 4). In some embodiments where the die is provided with an annular ridge 70, a lesser reduction of die diameter may be used than when the annular ridge is not present. The reduced die diameter provides compression of the lower sheet material which promotes back-filling behind the rivet shank. If the annular ridge 70 is present then it may provide at least some of this effect, and as such the same level of reduction of the die diameter may not be needed. In an embodiment, the diameter of the die may be less than 90% of a conventional die, less than 80% of a conventional die or maybe less than 65% of a conventional die.

The height of the annular ridge 70 may be selected such that lower sheet material which is forced past the annular ridge provides a reaction force which pushes material radially inwards towards the inwardly tapering part 46 of the rivet shank 4. The annular ridge 70 has a height which is selected such that it does not cut too far into the lower sheet 32. For example, the height of the annular ridge may be less than a quarter of the thickness of the lower sheet 32 (e.g. may be less than 0.6 mm). The height of the annular ridge 70 may depend on the thickness of the lower sheet 32 (for a thicker lower sheet a higher ridge may be used). The height of the annular ridge 70 may for example be in the range 0.2 mm-1.5 mm.

The angle of the chamfered face 72 of the annular ridge 70 may depend upon the ductility of the lower sheet 32. A smaller angle may be used if the lower sheet 32 is more ductile, and a larger angle may be used if the lower sheet is less ductile. For a less ductile the angle of the chamfered face 72 is greater to allow the chamfered face to cut into the material without significantly increasing the force needed to form the joint. In general, the chamfered face 72 promotes flow of lower sheet material towards the inwardly tapering part 46 of the rivet shank 4. In some instances a chamfered face may not be needed if the lower sheet of material is sufficiently ductile (this may be determined by performing test rivet insertions). The chamfered face 72 may for example have an included angle of up to 90 degrees. In an embodiment the face may include some curvature. In general the face may be tapered (e.g. chamfered or curved).

In the above described embodiments of the invention the lower portion of the shank 4 is configured such that it flares as it is inserted into the upper sheet (e.g. UHSS) of a workpiece to be joined. The flaring of the lower portion of the shank provides an inwardly tapering outer surface on the shank which receives lower sheet material (e.g. as depicted in FIG. 3), and this provides an interlock of the rivet in the lower sheet. As explained further above, the configuration of the die may promote the flow of lower sheet material into the inwardly tapering part of the rivet shank. This may for example be through the die having a smaller diameter than a conventional die and/or through the use of annular ridge or other feature of the die. In alternative embodiments of the invention, as now described, a rivet may be provided which has an inwardly tapering shank portion before insertion of the rivet into the workpiece. In other words, the rivet may be designed such that flaring of the shank is not required in order to form the inwardly tapering portion of the shank, but instead the rivet is manufactured with the inwardly tapering portion already provided on the shank.

Figure 8:
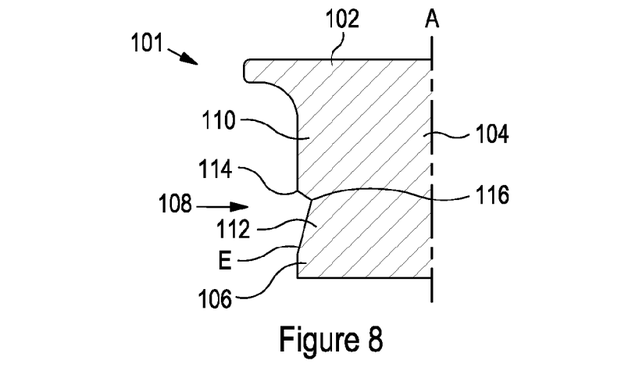
FIG. 8 depicts in cross-section half of a rivet according to an alternative embodiment of the invention.

FIG. 8 depicts in cross section half of a rivet 101 according to an embodiment of the invention. The rivet 101 comprises a head 102 and a shank 104. Unlike previous embodiments, no recess is provided at a bottom end of the shank 104 (although in other embodiments a recess may be provided). Some flaring of the flaring of the shank will nevertheless occur when the rivet is inserted into a workpiece, e.g. due to force applied by the workpiece upper layer against the rivet when the rivet is pushed into the workpiece upper layer. In some embodiments a shallow recess may be provided in the rivet, but this may be non-functional in the sense that it does not weaken the strength of the shank such that significant flaring of the shank occurs when the rivet is inserted into a workpiece.

In the embodiment of FIG. 8 the shank 104 of the rivet 101 comprises a lower shank portion 106, a middle recessed shank portion 108, and an upper shank portion 110. The diameter of the lower shank portion 106 is the same as the diameter of the upper shank portion 110. This is desirable because the diameter of the lower shank portion 106 will determine the size of the hole cut in the upper sheet of material being joined, and the upper shank portion 110 will fill that hole if it has the same diameter. This avoids gaps occurring between the rivet and the upper sheet when the joint has been formed. The upper sheet may for example be UHSS.

The middle recessed portion 108 comprises an inward taper 112 which extends from the lower shank portion 106 upwards towards the head 102. The inward taper 112 may be referred to as a chamfer 112. The chamfer 112 may have an angle E of at least 10 degrees relative to a line perpendicular to an axis A of the rivet. The chamfer may for example have an angle of up to 60 degrees, and may for example have an angle which is preferably 45 degrees or less. If the angle of the chamfer were to be less than 10 degrees then sufficient lower sheet material may not be received in the middle recess portion 108 to achieve a strong interlock with the lower sheet. If the angle is too large then it may be difficult for the lower sheet material to enter the middle recess portion and press against the shank.

An upper end of the middle recessed portion 108 has a taper 114 which extends outwardly towards the head 102 of the rivet. The angle of the upper taper 114 may be any suitable angle. The angle may be selected, in combination with the length of the upper shank portion 110 to ensure that an apex 116 of the middle recess portion 108 is within the lower sheet when a joint is made, such that lower sheet material can readily deform into the middle recess portion 108 and into the apex 116. If the lower sheet material deforms as far as the apex 116 then this provides a maximum interlock between the rivet 101 and the lower sheet. A joint may be formed without the lower sheet deforming as far as the apex 116, although this may be less strong than a joint in which the lower sheet has deformed as far as the apex. The position of the apex 116 may be selected based upon knowledge of the thickness of the lower sheet into which the rivet will be inserted.

Figure 9:
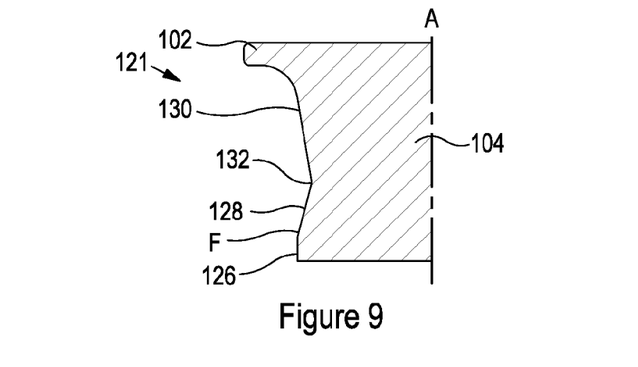
FIG. 9 depicts in cross-section half of a rivet according to an alternative embodiment of the invention.

A further alternative embodiment is depicted in FIG. 9. The rivet 121 of this embodiment has a head 102 and a shank 104. In this embodiment the shank comprises a lower shank portion 126, a middle inwardly tapering portion 128 and an upper outwardly tapering portion 130. The diameter of the lower shank portion 126 will determine the size of the hole cut into the upper sheet when a joint is made (the upper sheet may for example be UHSS). An upper end of the outwardly tapering portion 130 may have a diameter which corresponds with the diameter of the lower shank portion 126. Consequently, the upper end of the rivet shank may fill an upper part of the hole formed in the part of the upper sheet. The taper of the outwardly tapering portion 130 may be such that a gap between the rivet and the upper sheet exists further into the hole in the upper sheet. However, the engagement between the upper part of the outwardly tapering portion 130 and the upper sheet may be sufficient to provide a strong interlock with the upper sheet (in combination with the engagement provided by the head 102).

The inwardly tapering portion 128 may have a taper angle which corresponds with that described above in connection with FIG. 7. That is the inwardly tapering portion 128 may have an angle F of at least 10 degrees relative to a line perpendicular to an axis A of the rivet. The inwardly tapering portion 128 may for example have an angle of up to 60 degrees, and may for example have an angle which is preferably 45 degrees or less.

An apex 132 between the inwardly tapering portion 128 and the outwardly tapering portion 130 has a position which is determined by the angles of the inwardly tapering and outwardly tapering portions. The position of the apex 132 may be selected such that it is within the lower sheet material, thereby allowing the lower sheet material to be readily deformed into the apex. The selection may be based upon knowledge of the thickness of the lower sheet into which the rivet will be inserted.

In the embodiments of FIGS. 7 and 8 the lower shank portion 106, 126 has a length (in the direction parallel to the axis A of the rivet) which is sufficiently large that the lower shank portion does not undergo significant deformation during piercing through a UHSS sheet. If the lower shank portion 106, 126 were shorter then there would be a risk that it would deform when piercing through a UHSS sheet (the UHSS may have a similar tensile strength to the rivet, and thus may cause deformation of the rivet) However, the length of the lower shank portion 106, 126 is sufficiently small that the inwardly tapering portion 112, 128 of the rivet will be received in lower sheet material such that lower sheet material may flow into that portion. The length of the lower shank portion 106, 126 may for example be in the range 0.5 millimetres to 2 millimetres, and may be in the range 1 millimetre to 1.5 millimetres.

Figure 10A:
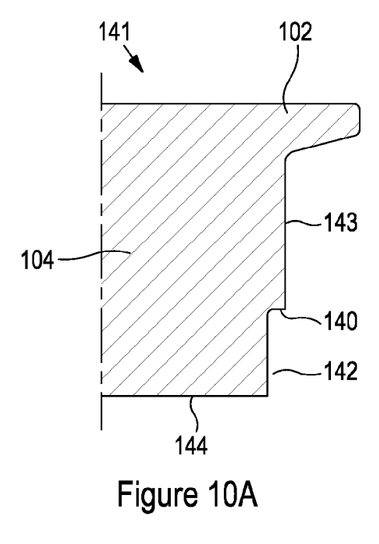
FIG. 10A depicts in cross-section half of a rivet according to an alternative embodiment of the invention partway through manufacture of the rivet.
Figure 10B:
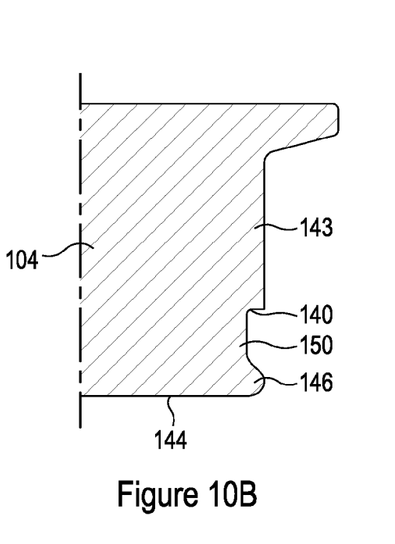
FIG. 10B depicts in cross-section half of the rivet of FIG. 10A once manufacture of the rivet has been completed.

The embodiments depicted in FIGS. 8 and 9 may be constructed by cold forging followed with a secondary rolling or machine operation to form the tapered parts of the shank. An embodiment is depicted in FIG. 10 which does not require secondary rolling or machining. Referring first to FIG. 10A, a rivet 141 is formed which comprises a head 102 and a shank 104. The rivet does not have a recess at the bottom of the shank (although in other embodiments a recess may be provided). A step 140 is cut into the shank to form a lower shank portion 142 which has a reduced diameter compared with an upper shank portion 143. The lower shank portion 142 may be less than 50% of the length of the shank 104, less than 40% and may preferably less than 30% of the length of the shank. A further manufacturing step is applied to the rivet, namely forging the rivet tip 144 radially outwards such that, as depicted in FIG. 10B a lip 146 is formed at the tip of the rivet. The lip 146 may have a diameter which corresponds with a diameter of the upper shank portion 143 of the shank 104. The step 140 and the lip 146 in combination define an annular groove 150. The annular groove 150 may receive lower sheet material when a joint is formed in the manner described above in connection with other embodiments.

Figure 11:
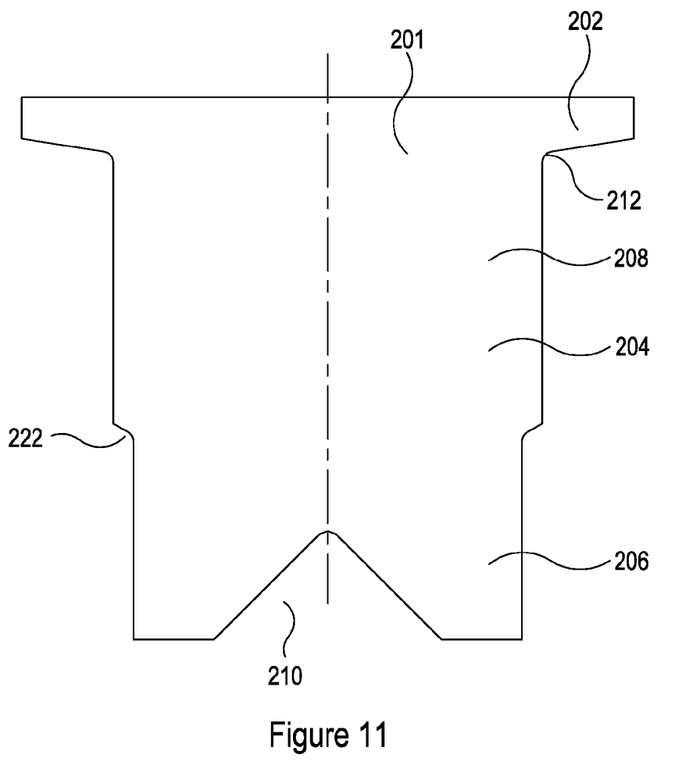
FIG. 11 depicts in cross-section a rivet according to an alternative embodiment of the invention.

FIG. 11 depicts a rivet 201 according to an alternative embodiment of the invention. A shank 204 of the rivet 201 has a lower portion 206 with a first diameter and an upper portion 208 with a second diameter which is larger than the diameter of the lower portion. The diameter of the upper portion 208 may for example be between 1 and 12% greater than the diameter of the lower portion 206. The upper portion 208 may have an outer diameter of 5.5 mm. The lower portion 206 may have an outer diameter of 5 mm. A transition between the upper and lower portion is in the form of a concave connection 222. However, the transition may have some other tapered form. For example a chamfered connection may be provided. A 90 degree step is not preferred because it may be difficult to push such a step through UHSS.

The rivet 201 includes a recess 210 at a bottom end of the shank 204. The recess is conical in this embodiment, but may have some other shape. The recess 210 causes the rivet shank to flare when it is inserted into an upper sheet of UHSS.

The lower portion 206 of the shank 204 may for example have a length in the axial direction which is less than half of the length of the rivet 201. The lower portion 206 of the shank 204 may for example have a length in the axial direction of around 2.5 mm. The recess 210 may have a depth which is less than half of the length of the rivet. The recess 210 may have a depth which is less than half of the length of the lower portion 206 of the shank 204.

The rivet has a head 202, which may have a diameter of 7.75 mm. The head 202 is connected to the shank upper portion 208 via a fillet radius 212. The fillet radius may for example be around 0.4 mm or more (it may be difficult to cut a fillet radius which is smaller than this). The fillet radius may for example be up to around 0.8 mm (if the fillet radius is larger than this then difficulties may arise pushing the rivet into the workpiece (as explained further above). The fillet radius may be between 0.5 mm and 0.75 mm. Using a small fillet radius in this range aids sealing of the rivet against a UHSS upper sheet and reduces the likelihood of a gap being present between the rivet head and the UHSS upper sheet (see FIG. 12 as described below).

Figure 12:
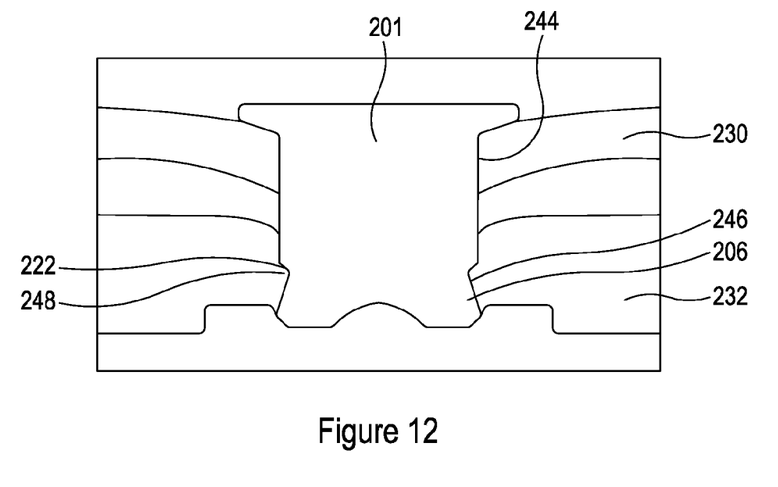
FIG. 12 depicts in cross-section an alternative joint between three sheets of material made using a rivet according to an embodiment of the invention.

FIG. 12 depicts a joint made using the rivet 201 depicted in FIG. 11. Unlike previously illustrated and described joints, this joint does not include a button of lower sheet material beneath the rivet. Instead, the rivet penetrates through all sheets of material which form the joint, and a bottom end of the shank is exposed.

When the rivet 201 is inserted into an upper sheet of UHSS 230, the lower portion 206 of the shank 204 flares outwardly. As a result, an inwardly tapering portion 246 is formed in the outer surface of the shaft. A recess 248 is thereby formed by the combination of the inwardly tapering portion 246 and the rounded connection 222. Lower sheet material 232 flows into the recess 248, thereby providing an interlock between the rivet and the lower sheet 232.

In common with other embodiments, the increased diameter of the upper portion 208 may correspond with flaring of the lower portion 206 of the shank 204 which occurs when the rivet penetrates through an upper UHSS sheet. The hole cut into the UHSS sheet 230 by the flared lower portion 206 of the shank 204 may have a diameter which is 1-12% larger than the diameter of the lower portion of the shank before rivet insertion. The increased diameter upper portion 208 of the rivet shank fills the hole 244 which was cut by the flared lower portion 206 of the shank 204 (as may be seen in FIG. 9). This provides better engagement between the inserted rivet and the upper UHSS sheet than would otherwise be the case. In particular, it avoids the creation of a gap between the rivet shank and the UHSS sheet which extends from the head downwardly along the rivet shank. Such a gap is undesirable because this may allow moisture ingress into the joint and may impair the fatigue life of the joint.

Figure 13:
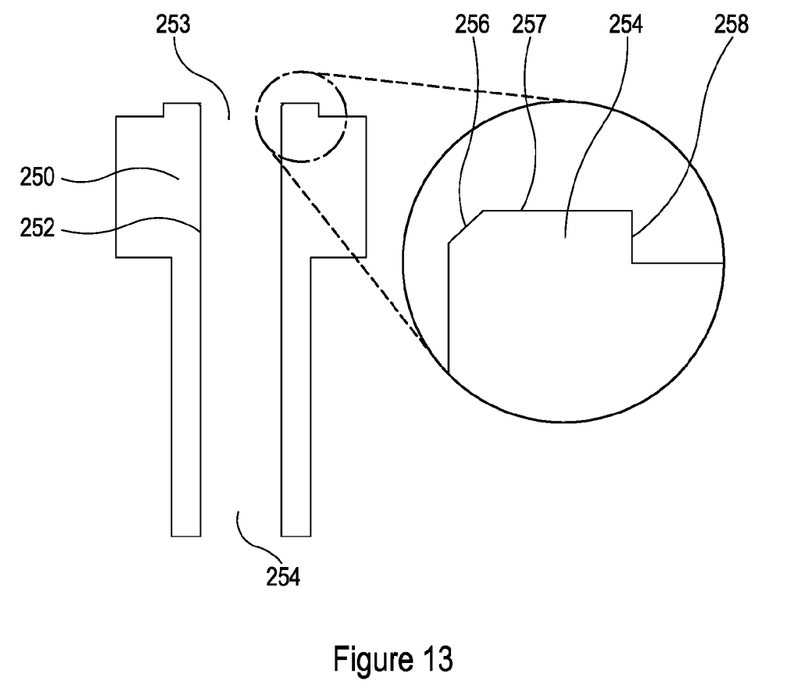
FIG. 13 depicts in cross-section a die used to form the joint depicted in FIG. 12.

FIG. 13 depicts a die 250 which may be used together with the rivet depicted in FIG. 11. The die 250 comprises a cylindrical wall 252 which defines a cylindrical opening 253. Unlike dies depicted in preceding figures, the die 250 does not include a bottom surface which is configured to deform the lower sheet to form a button of material. Instead, the die 250 is open at its bottom end 254. This allows slugs of material cut from sheets being joined to pass down and out of the die 250. The diameter of the cylindrical opening 253 of the die 250 may be selected with reference to the diameter of the lower portion 206 of the rivet 201 (as measured before rivet insertion). For example, if the lower portion 206 of the rivet 201 has a diameter of 5 mm then the cylindrical opening 253 of the die 250 may have a diameter of between 5.8 mm and 6 mm. This is sufficiently large to receive slugs of material cut from sheets being joined.

In general, the lower portion of the rivet 201 may have a diameter between 4 mm and 6 mm. The cylindrical opening 253 of a corresponding die 250 may have a diameter between 4.5 mm and 7 mm. The diameter of the cylindrical opening may be between 0.5 mm and 1 mm greater than the diameter of the lower portion 206 of the rivet 201.

In common with the die described further above, the die 250 of FIG. 13 includes an annular ridge 254 which extends around an outer edge of the cylindrical opening 253 of the die. The annular ridge 254 has an inwardly facing chamfered inner face 256. An upper end of the chamfered face 256 is connected to a flat upper surface 257 of the annular ridge 254. A downward step 258 is provided at an outer edge of the annular ridge 254. The annular ridge 254 promotes flow of lower sheet material radially inwards when a join is being formed (towards the inwardly tapering portion 246 of the rivet shank 204).

The height of the annular ridge 254 may be selected such that lower sheet material which is forced past the annular ridge provides a reaction force which pushes material radially inwards towards the inwardly tapering part 246 of the rivet shank 204. The annular ridge 254 has a height which is selected such that it does not cut too far into a lower sheet of a joint. For example, the height of the annular ridge may be less than a quarter of the thickness of the lower sheet (e.g. may be less than 0.6 mm). The height of the annular ridge 254 may depend on the thickness of the lower sheet being joined (for a thicker lower sheet a higher ridge may be used). The height of the annular ridge 254 may for example be in the range 0.2 mm-1.5 mm.

The annular ridge 254 includes a chamfered face 256. If there is some misalignment between the rivet 201 and the die 250, then the rivet may hit the chamfered face 256 and the chamfered face may guide the rivet into the bore 253. In general, the annular ridge may include a tapered inner face. In some embodiments the annular ridge may not have a tapered inner face.

Referring to FIG. 12 it may be seen that a strong joint has been made between the UHSS upper sheet, the middle sheet and the lower sheet. The lowermost sheet has flowed into the inwardly tapering portion 246 of the rivet shank 204, and forms a strong interlock between the lowermost sheet and the rivet 201. The annular ridge 254 of the die has been pressed into a bottom surface of the lowermost sheet, and has formed an annular recess in the lowermost sheet which surrounds the rivet.

Embodiments of the invention may be used to join UHSS to aluminium. Embodiments of the invention may be used to join UHSS to any other suitable material. For example, embodiments of the invention may be used to join UHSS to steel which has a lower tensile strength than UHSS.

The term UHSS as used in this document may refer to steel with a tensile strength of 800 MPa or more. The steel may have a tensile strength of 1000 MPa or more, and may have a tensile strength of 1500 MPa or more. The steel may have a tensile strength of up to 2000 MPa.

A rivet according to an embodiment of the invention may be formed from steel. The steel may for example have a hardness of 4 or 5. This is lower than a rivet steel hardness of 6 which would conventionally be used when forming a joint in UHSS. Prior art methods of joining a workpiece that comprises a UHSS sheet use rivets having a hardness of 530 HV or more. However, when using an embodiment of the invention a softer rivet may be used. This is because the rivet has a recess which is not as deep as the recess in a conventional rivet, and thus does not weaken the rivet to the same extent. For example, a rivet with a hardness of less than 530 HV may be used. For example, a rivet with a hardness of between 400 HV and 510 HV may be used. In other embodiments, a rivet with a hardness of 510 HV or more may be used (e.g. a rivet with hardness of 530 HV or more).

In this document the term "tapered" in connection with a diameter may be interpreted as meaning a gradual transition from a larger diameter to a smaller diameter. It does not necessarily require that the transition is linear.

Different features of rivets according to different embodiments of the invention may be combined together. For example, a recess shape or depth as described in one embodiment may be used for other embodiments. For example, a taper or step provided on the outer surface of the shank in one embodiment may be used for other embodiments. For example, a geometry provided at a lowermost end of a rivet shank in one embodiment may be used for other embodiments.

In this document references to the diameter of the shank are intended to exclude a transition (e.g. fillet radius) between the shank and the head of the rivet.

The invention claimed is:

1. A method of forming a riveted joint comprising a UHSS layer and a non-UHSS layer, using a self-piercing rivet comprising a head and a shank, the shank comprising a lower shank portion, and an upper shank portion, a recess extending at least part way into the lower shank portion, wherein an outer diameter of the upper shank portion is greater than an outer diameter of the lower shank portion, the method comprising:
   pushing the self-piercing rivet into the UHSS layer such that the lower portion of the shank flares outwardly and cuts a slug from the UHSS layer; and
   pushing the self-piercing rivet and slug into the non-UHSS layer such the lower portion of the shank cuts a slug from the non-UHSS layer;
   wherein a die receives the slugs from the UHSS and non-UHSS layers, and wherein the die promotes flow of the non-UHSS layer around an outer surface of the lower shank portion;
   wherein the upper portion of the shank comes into contact with the UHSS layer around a circumference of the shank.

2. The method of claim 1, wherein the die comprises an annular ridge which extends around an outer edge of a die recess of the die, wherein optionally the annular ridge includes a tapered face which is generally directed towards the rivet.

3. The method of claim 1, wherein the die comprises an annular ridge which extends around a cylindrical opening, the cylindrical opening defining a diameter which is between 0.5 mm and 1 mm greater than the outer diameter of the lower shank portion.

* * * * *